US009464912B1

(12) United States Patent
Smus et al.

(10) Patent No.: US 9,464,912 B1
(45) Date of Patent: Oct. 11, 2016

(54) BINAURAL NAVIGATION CUES

(71) Applicant: Google Inc., Mountain View, CA (US)

(72) Inventors: Boris Smus, San Francisco, CA (US); Antonio Bernardo Monteiro Costa, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/705,481

(22) Filed: May 6, 2015

(51) Int. Cl.
*G01C 21/36* (2006.01)

(52) U.S. Cl.
CPC ................................ *G01C 21/3629* (2013.01)

(58) Field of Classification Search
CPC ... G01C 21/3629; G01C 21/20; H04S 5/005; H04S 5/033; A61H 3/061; G06F 3/011
USPC .......................................................... 701/428
See application file for complete search history.

(56) References Cited

U.S. PATENT DOCUMENTS

| 6,097,315 | A | 8/2000 | Minter | |
|---|---|---|---|---|
| 2008/0008342 | A1 | 1/2008 | Sauk | |
| 2010/0169781 | A1* | 7/2010 | Graumann | G06F 3/011 715/727 |
| 2011/0153044 | A1 | 6/2011 | Lindahl et al. | |
| 2012/0268563 | A1* | 10/2012 | Chou | A61H 3/061 348/46 |
| 2013/0322667 | A1* | 12/2013 | Christensen | H04R 5/033 381/309 |
| 2014/0107916 | A1* | 4/2014 | Urup | G01C 21/20 701/425 |
| 2014/0114560 | A1* | 4/2014 | Jensen | G01C 21/3629 701/409 |
| 2015/0030159 | A1 | 1/2015 | Ozcan | |
| 2015/0063610 | A1* | 3/2015 | Mossner | H04S 5/005 381/307 |

FOREIGN PATENT DOCUMENTS

| EP | 2669634 A1 | 12/2013 |
|---|---|---|
| WO | WO2010020788 A1 | 2/2010 |

OTHER PUBLICATIONS

Lui et al., 'Audio aid—Binaural navigation for people with visual impairment,' Singapore University of Technology and Design 2015, Theme Horse, WordPress, Abstract, 2 pages.
International Search Report and Written Opinion in International Application No. PCT/US2016/028413, mailed Jul. 29, 2016, 16 pages.

\* cited by examiner

*Primary Examiner* — McDieunel Marc
*Assistant Examiner* — James E Stroud
(74) *Attorney, Agent, or Firm* — Fish & Richardson P.C.

(57) ABSTRACT

Methods, systems, and apparatus, including computer programs encoded on a computer storage medium, for providing binaural navigational cures. In one aspect, a method includes presenting audio media in a non-directional playback state that presents the audible media in an original format, iteratively determining a navigational heading relative to a current navigational course, the navigational heading indicative of a direction to face to proceed along a navigational route, and for each iteration, determining whether a change is required to the current navigational course based on the navigational heading. For each determination that a change is not required to the current navigational course, presenting the audio media in the non-directional playback state, and for each determination that a change is required to the current navigational course, changing the non-directional playback state to a directional playback state that presents the audible media in a modified format that is directional from the navigational heading.

21 Claims, 8 Drawing Sheets

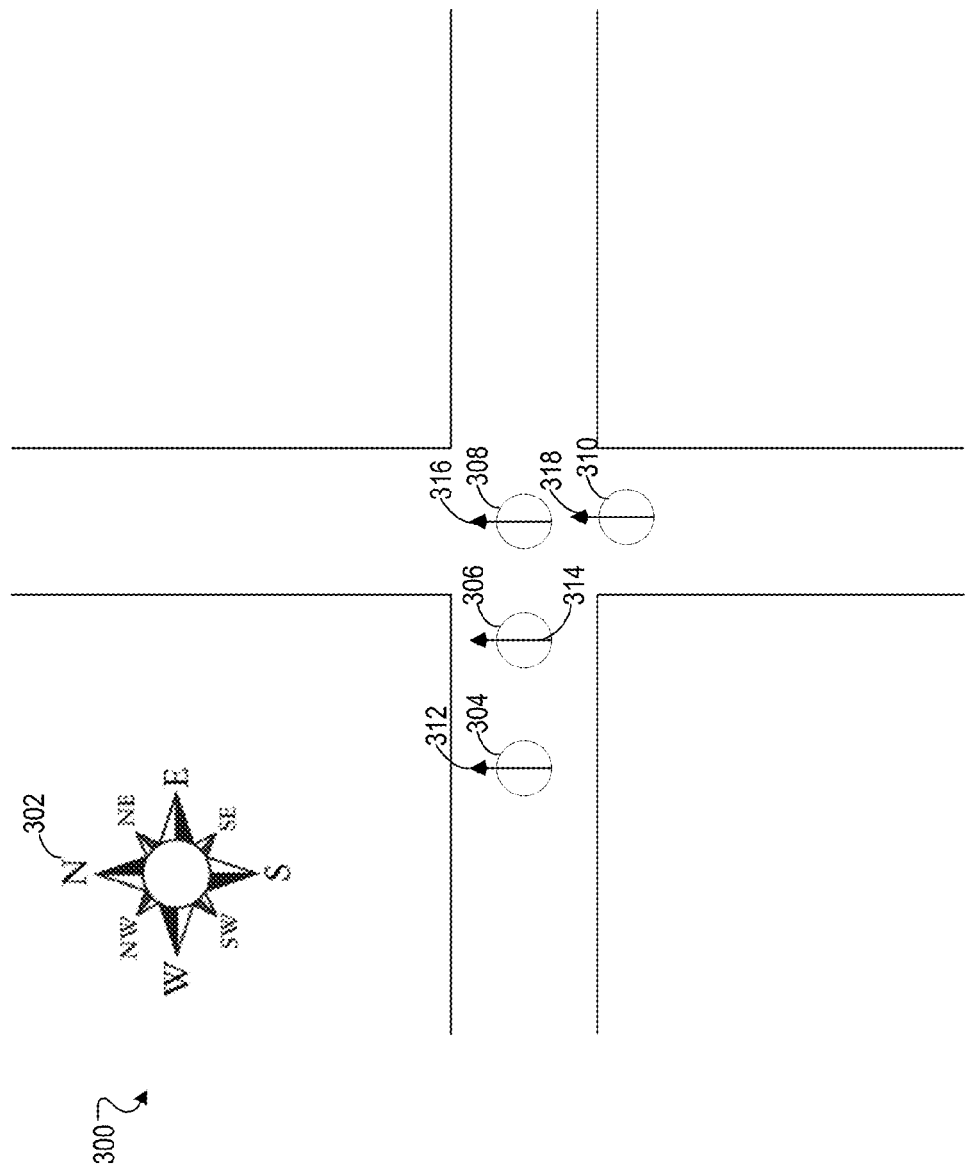

BINAURAL NAVIGATION CUES

BACKGROUND

This specification relates to navigational cues.

Navigating a city or a space can be frustrating and daunting. Recent advances in technology enable navigational instruction describing how to get from one geographic location to another geographic location. Generally, navigation technology uses the global positioning system (GPS), compasses, and maps. More recent technology uses mobile devices (e.g., smart phones, tablets, etc.) with integrated GPS, digital maps, and magnetometers. These mobile devices allow users to get navigational directions when the user is away from their home (e.g., in the car, at the grocery store, walking around a city). In addition, many of the mobile devices that provide navigational directions give notifications of up-coming changes in direction by way of audio cues that are superimposed over audio that is currently being provided by the system, e.g., by way of voice notification to turn in a certain direction that is superimposed over music.

SUMMARY

This specification describes technologies relating to binaural navigation cues.

In general, one innovative aspect of the subject matter described in this specification can be embodied in methods that include the actions of presenting audio media in a non-directional playback state that presents the audio media in an original format over a plurality of audio channels, iteratively determining a navigational heading relative to a current navigational course, the navigational heading indicative of a direction to face to proceed along a navigational route, and for each iteration, determining whether a change is required to the current navigational course based on the navigational heading. For each determination that a change is not required to the current navigational course, presenting the audio media in the non-directional playback stat, and for each determination that a change is required to the current navigational course, changing the non-directional playback state to a directional playback state that presents the audible media in a modified format that is directional from the navigational heading. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The systems and methods disclosed herein enable directions to be provided to user without interrupting playback of a media file. By providing binaural navigational cues, the systems and methods offer an intuitive mechanism to deliver navigational instructions to a user. The binaural navigational cues provides cues in spatial relation to a specific destination using spatialized sound that makes the presentation of audio media to appear to be originating from a source that is in the direction that the user is to be heading. Because people naturally localizing sound, the providing of spatial navigational cues to the user results in a lighter cognitive load than when the user is provided vocal or other navigational cues that are superimposed over existing audio.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is an illustration of a map and another implementation of providing binaural navigational cues.

Like reference numbers and designations in the various drawings indicate like elements.

DETAILED DESCRIPTION

Overview

Systems and methods for delivering binaural navigational cues provide audible navigational directions for a mapped navigational route. In some implementations, audio (e.g., from a media file) that is presented to a user is modified to provide the binaural navigational cues. For example, the binaural navigational cues can include modifying the audio that is presented to appear to sound 3-dimensional and appear to come from the direction that a user is intended to pursue. By spatializing the playback of a media file, the present systems and methods can change to a directional playback state that presents the audible media such that it appears to be presented (e.g., heard) from a specific direction.

Providing binaural navigational cues can help users who are following a navigational route (e.g., in a vehicle, traveling on foot, etc.) intuitively navigate towards a desired destination. The presentation of the audible media does not have to be interrupted to notify a user that a change is required in a current navigational course. For example, the audible media can be presented to a user in the audible media's original recorded format (e.g., unmodified from the original recording, as presented live, etc.). Upon determining that a change in the current navigational course is required, the present systems and methods modify the playback of the audible media to present the audible media as to appear as though the sound is coming from the determined navigational heading (e.g., the direction the user should alter their current course).

In some implementations, the binaural navigational cues can provide intermittent or constant notifications that enable the user to consistently recognize their current position relative to a predefined position. In addition, the present systems and methods can facilitate providing binaural navigational cues when the user engages an interactive map. For example, a user may click on a geographic location on an interactive map and an audible cue may presented to the user in the direction of the geographic location.

These features and other features will be discussed in more detail below.

Example Operating Environment

Figure 1A:
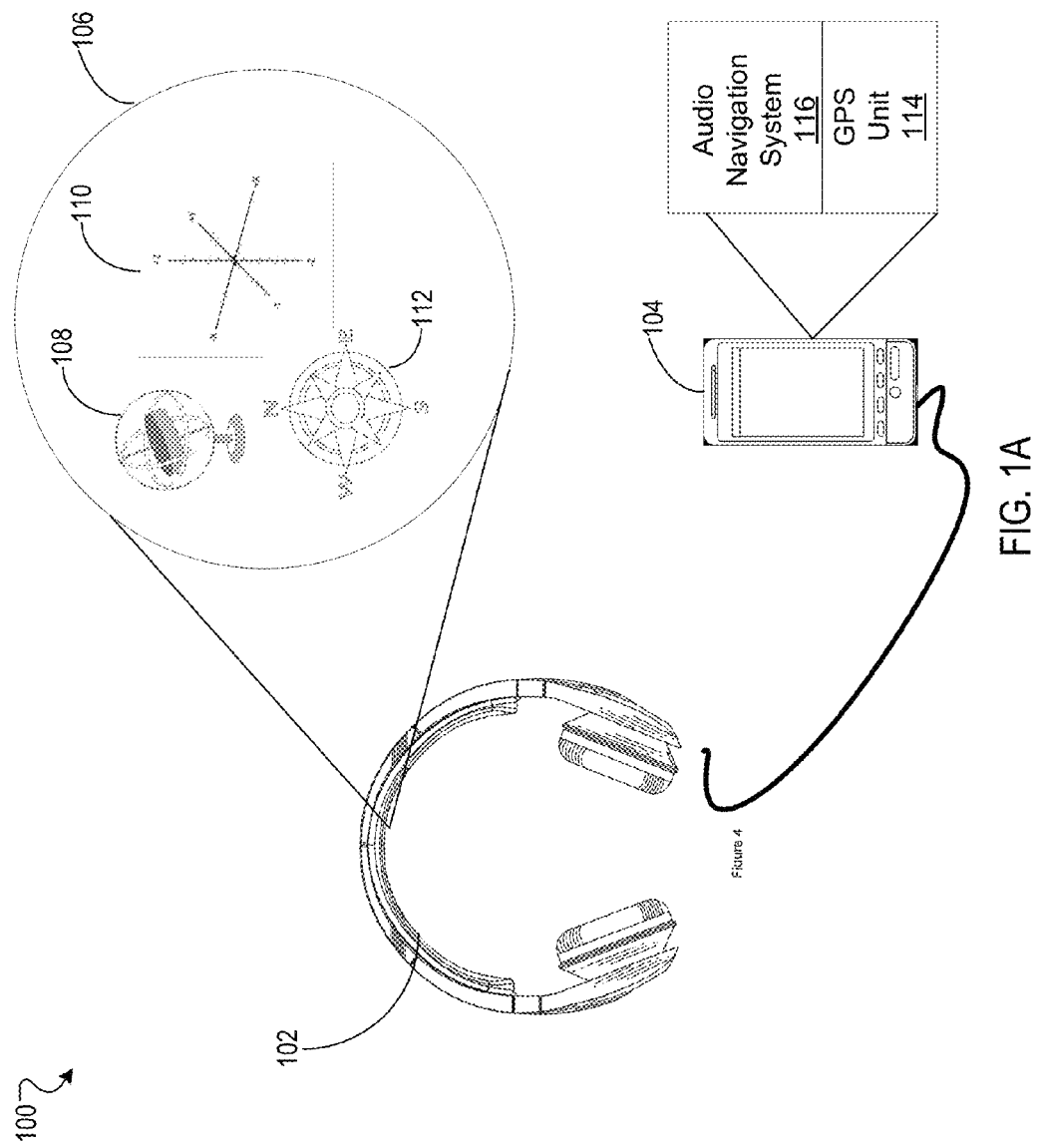
FIG. 1A is an illustration of an example binaural cue system that provides binaural navigational cues.

FIG. 1A is an illustration of example binaural cue system 100 that provides binaural navigational cues. The example binaural cue system 100 can include a pair of headphones 102 and a user device 104. Typically a user will be listening to audio media by use of the headphones 102 and user device 104. The audio media may be pre-recorded audio media (e.g., podcast, music, movie, etc.), or live broadcast audio media (e.g., radio broadcast, television broadcast, etc.).

Typically, the headphones 102 enable playback of audio media to be presented in stereophonic sound (e.g., stereo). Stereophonic sound enables sound reproduction that can create the appearance of sound directionality and audible perspective.

In some implementations, the headphones 102 can be a smart set of headphones that include an inertial motion unit 106. The inertial motion unit includes an accelerometer 110, a gyroscope 108, and a compass 112. The smart headphones enable the example binaural cue system to determine head orientation and where the user is looking (e.g., heading and absolute heading) in real-time.

The accelerometer 110 can measure proper acceleration. The gyroscope 108 can track rotation. Combining the functions of the accelerometer 110 and the gyroscope 108, the binaural navigational system 100 can determine the position of the binaural navigational system 100, as well as the ability to track the system's movement. The compass 112 can determine which way the binaural navigational system 100 is facing with respect to cardinal north. As will be explained in more detail below, these inertial motion unit 106, gyroscope 108, accelerometer 110 and compass 112 are optional and can be omitted. However, if included, these devices can further enhance the provisioning of navigational cues using the user device 104.

The user device 104 can be a mobile phone, a tablet, a global positioning device with audio playback capabilities, or any other suitable device that can provide a digital map and audio playback. The user device works together with the headphones 102 to present the audio media and binaural navigational cues. The user device 104 includes a global positioning system (GPS) unit 114 that gives the user device 104 the ability to use GPS to facilitate the binaural navigational system's determination of the current geographic location of the user device 104.

The user device includes an audio navigation system 116 that has the ability to modify the playback of audible media from a non-directional playback state to a spatialized playback (e.g., directional playback state) of the audible media. In some implementations, the audio navigation system 116 can use a spatialization algorithm to produce a virtual sound that can make the sound appear as if it is coming from any direction within 360 degrees around the user. For example, the audio navigation system 116 can use a head-related transfer function (HRTF) to modify the presentation of audio from a non-directional playback state to a directional playback state, as will be described in more detail below. The HRTF characterizes how a user perceives sound for a given point in space.

Figure 1B:
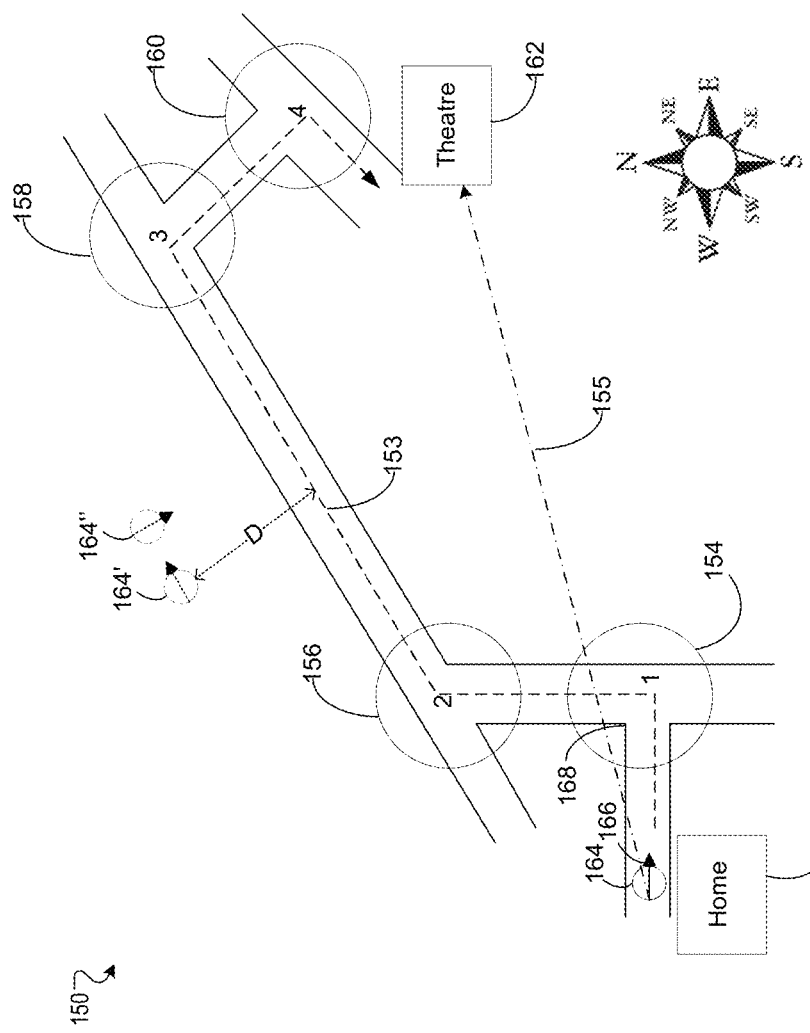
FIG. 1B is an illustration of an example route.
Figure 1C:
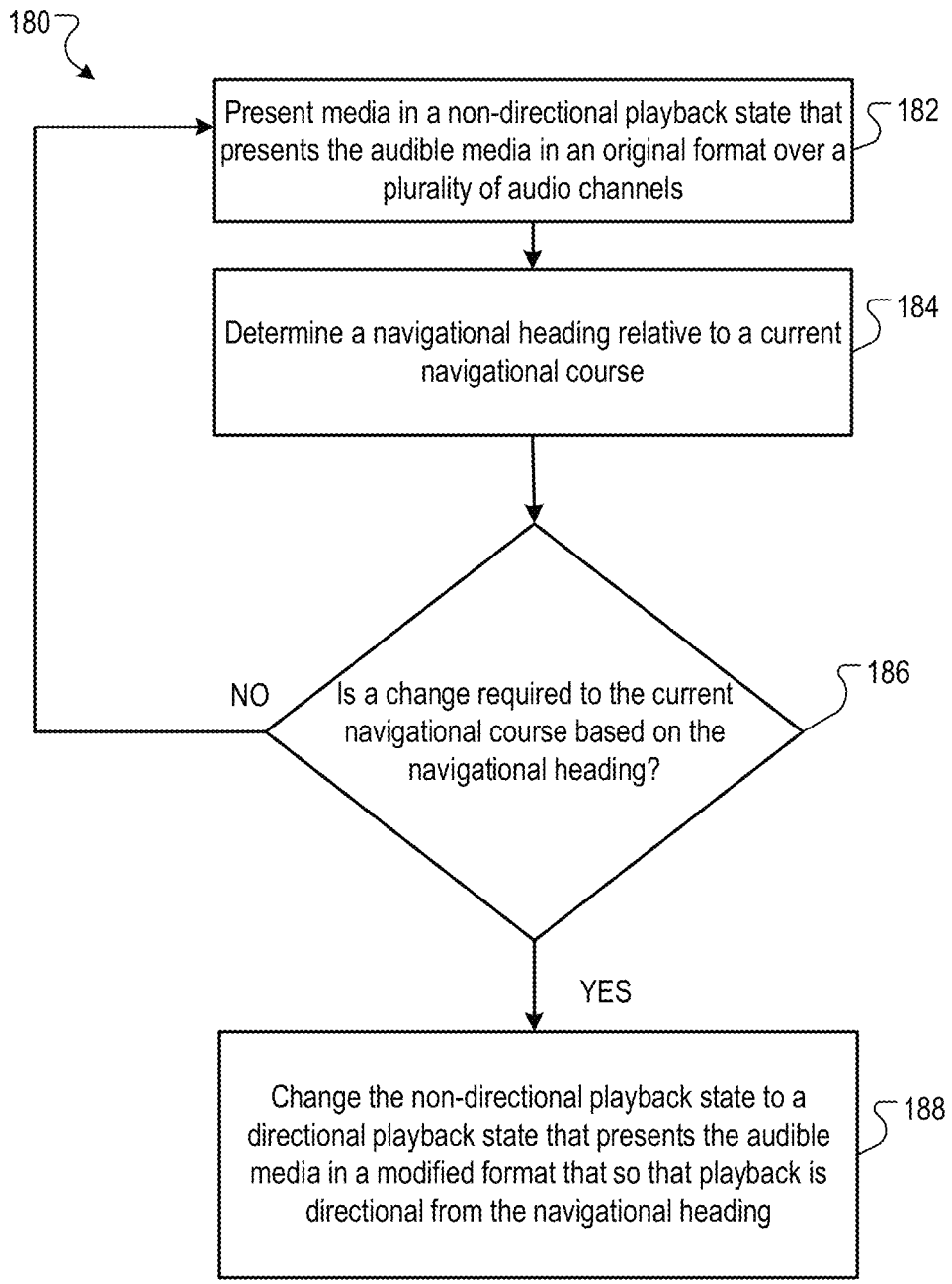
FIG. 1C is a flow diagram describing a process for providing navigational cues when a navigational route is mapped.

An example use case of the system 100 is described with reference to FIG. 1B, which illustrates an example navigational route. FIG. 1B is also described in the context of FIG. 1C, which is a flow diagram describing a process 180 for providing navigational cues when a navigational route is mapped. The map 150 may be, for example, a digital map used to map and give directions for a navigational route from one location to a destination. For example, a user may decide to walk from home 152 to a theater 162.

The user can input the start point as the user's home 152 address and the destination as the theater 162 address. Typically, the digital map 100 will determine the best navigational route (e.g., fastest route, shortest route, etc.) to travel from the home 152 to the theater 162. As illustrated in FIG. 1B, the navigational route 153 is determined to have a change in navigational heading at four different locations (e.g., waypoints) 1, 2, 3, and 4 before ending at the theater 162.

The user then begins her walk to the theater 162. At this time, for example, the user device presents the audio media in a non-directional playback state (182). A non-directional playback state is a state in which the audio media is presented in an original format over two or more audio channels, and is not directionally related to the user's route. Thus, while stereo audio may be perceived to have directional sources, such as a bass predominantly weighted on one channel, for example, the directional sources are non-directional in the sense that they are presented according to the original recording or reception, and not modified to signal a navigational cue.

In some implementations, each waypoint 1, 2, 3, 4 can have a respectively associated waypoint region 154-160 that is used to determine when to begin providing a binaural navigational cue to indicate an upcoming change in navigational heading as determined by the binaural navigational cue system 100. Further details regarding different implementations of providing navigational cues upon entering a waypoint region 154-160 will be described in further detail in connection with FIGS. 2A, 2B, and 2C.

Using the GPS unit 114 within the user device and signals received from the inertial motion unit 106, the user device can determine current geographical location 164 and current navigational heading 166. Based on the determination of the current geographical location and the current navigational heading, the binaural navigational cue system 100 can determine whether a change to the current navigational course is necessary.

As the user navigates along the navigational route towards the waypoint 1, the binaural navigational system iteratively determines a navigational heading relative to a current navigational course, the navigational heading indicative of a direction to face to proceed along a navigational route (184). For example, every n seconds, e.g., n=2, or some other time period, the system 100 determines the user's heading and location relative to the navigation course 153. For each determination, the system also determines whether a change is required to the current navigational course based on the navigational heading (186).

In this example, if the user has not reached waypoint 1 at the intersection 168, the binaural navigational cue system 100 determines that the user is to continue along the current navigational course. For example, each determination that a change is not required to the current navigational course results in continuation presentation the audio media in the non-directional playback state (182).

If the user has reached waypoint 1 at the intersection 168 (or another waypoint position along the route where a change in navigational course is necessary to proceed along the navigational route), the binaural navigational system indicates a determined navigational heading. For example, for each determination that a change is required to the current navigational course, the system 100 changes the non-directional playback state to a directional playback state that presents the audible media in a modified format so that playback is directional from the navigational heading (188). In some implementations, the modified format is achieved by modulating a sound level of at least one of the audio channels. In other implementations, a head-related transfer function (HRTF) is used to modify the presentation of audio from a non-directional playback state to a directional playback state. Other appropriate modifications of the audio can be used to cause the audio to have a directionality from the navigational heading. A change in the current navigational course can include changing a current navigational heading to a determined navigational heading and proceeding forward along the determined navigational heading. For example, assume the user is walking east and reaches the way point 1. A determined navigational heading would thus be 90 degrees in the left direction from the current navigational heading (i.e., a left turn, so that the user is heading north). Thus, the user would receive a binaural navigational cue as an instruction to change headings 90 degrees in a left direction. The playback of the audio media file would change from the non-directional playback state to the directional playback state. To indicate a change in heading that is 90 degrees left, the directional playback state may modify the playback of the audio media to only play in the left ear of the headphones 102, indicating for the user to turn left.

In some implementations in which only a GPS system is used, route corrections may not be sensed until the user has taken several steps in the new direction. Once the user's new route is determined, the presentation of audio will resume to the non-directional state if the user is heading in the direction of the navigational route. Alternatively, if the user is not heading in the correct direction, then the audio is again adjusted to indicate the route correction. In some implementations, when a user is heading in a direction 180 degrees from a current route, the audio presentation may paused or shut off to indicate the user is required to turn around to head in the correct direction.

In implementations in which the system 100 can determine a user's current facing, e.g., by using gyroscopic and inertia sensors, navigational cue may be adjusted more quickly. For example, if a user becomes confused about the direction in which she needs to be heading, she can pause and slowly turn until she determines the correct heading from the changing navigation cues.

In some implementations, the user's distance from a route may also result in a navigational cue, even if the user is heading in a correct direction. For example, in FIG. 1B, the user symbol 164' indicates the user has strayed from the path 153 by at least a threshold distance D. Once the user's location is at least a distance D from the path 153, the system 100 causes the user device to present audio in a directional state to correct the user's course. The navigational cue may in the form of an absolute correction that indicates the shortest path the user must take to get back on course, as indicated by the user symbol 164". Alternatively, the system 100 may instead calculate a new route and resume navigation from the user's current location on the new route.

In some implementations, the map 150 of FIG. 1B can be displayed on the user device 104 as an interactive map that can have items highlighted, marked, the map moved, etc. by the touch of a user's finger.

In some implementations, upon the user interacting with the map 150 by touching a location on the screen of the user device 104, the binaural navigational cue system 100 can provide binaural cues indicating the navigational heading of the location. The binaural navigational system can provide an audible cue that appears to come from the direction that the location is positioned.

In some implementations, the system 100 can provide a navigational cue that indicates a straight line direction from a user's current location to a destination location. For example, in FIG. 1B, the line 155 indicates a direction to a location from the user's current position. The general direction can be sensed by, for example, interacting with the digital map by pressing on a destination location.

Figure 1D:
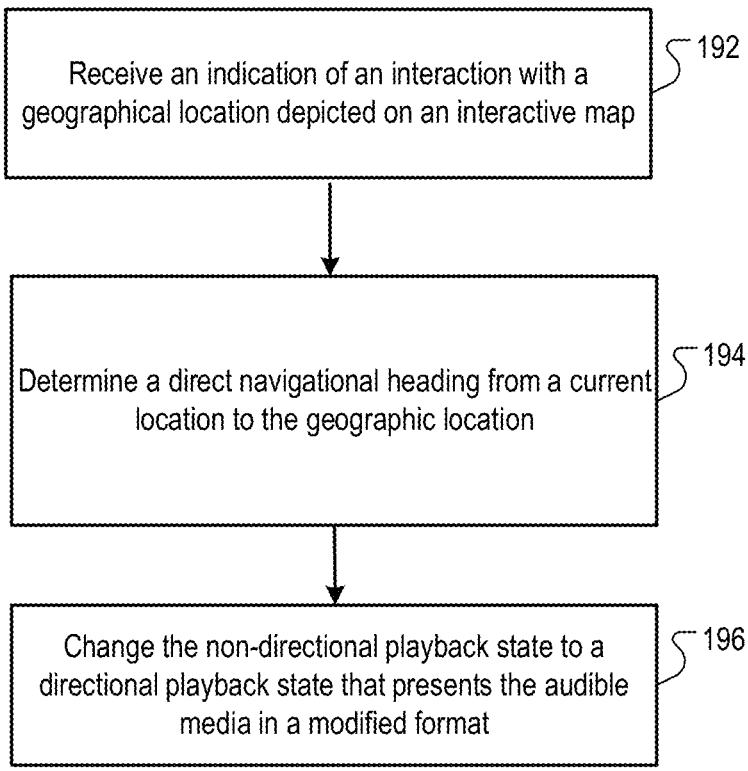
FIG. 1D is a flow diagram describing a process for providing navigational cues in response to an interaction with an interactive digital map.

FIG. 1D is a flow diagram 190 describing a process for providing navigational cues in response to an interaction with an interactive digital map. For example, the binaural navigational system receives an indication of an interaction with a geographical location depicted on the interactive map (192). Here, the user may press on the theater 162 location. Upon receiving the indication of the user interaction, the binaural navigational cue system determines a direct navigational heading from the current location of the geographic location (194). For example, given the user's current position, the system 100 determines the theater 162 is located in the direction of the line 155, e.g., at a heading of approximate 70 degrees from absolute North. The binaural navigational system 100 changes the non-directional playback state to a directional playback state that presents the audible media in a modified format that modulates a sound level of at least one of the audio channels so that playback is directional from the direct navigational heading (196). In some instances, this can help users who are walking determine where they are and which direction they are facing relative to a potential known landmark.

In the example above, the navigational cues occurred when the user was near a waypoint. However, in some implementations, navigational cues may begin when a user enters a waypoint region that surrounds a waypoint. As a user proceeds along a navigational route and upon entering a waypoint region, the binaural navigational cue system 100 recognizes that the user device 104 is within the waypoint region, and begins to provide binaural cues indicating a necessary change in navigational heading is approaching.

Figure 2A:
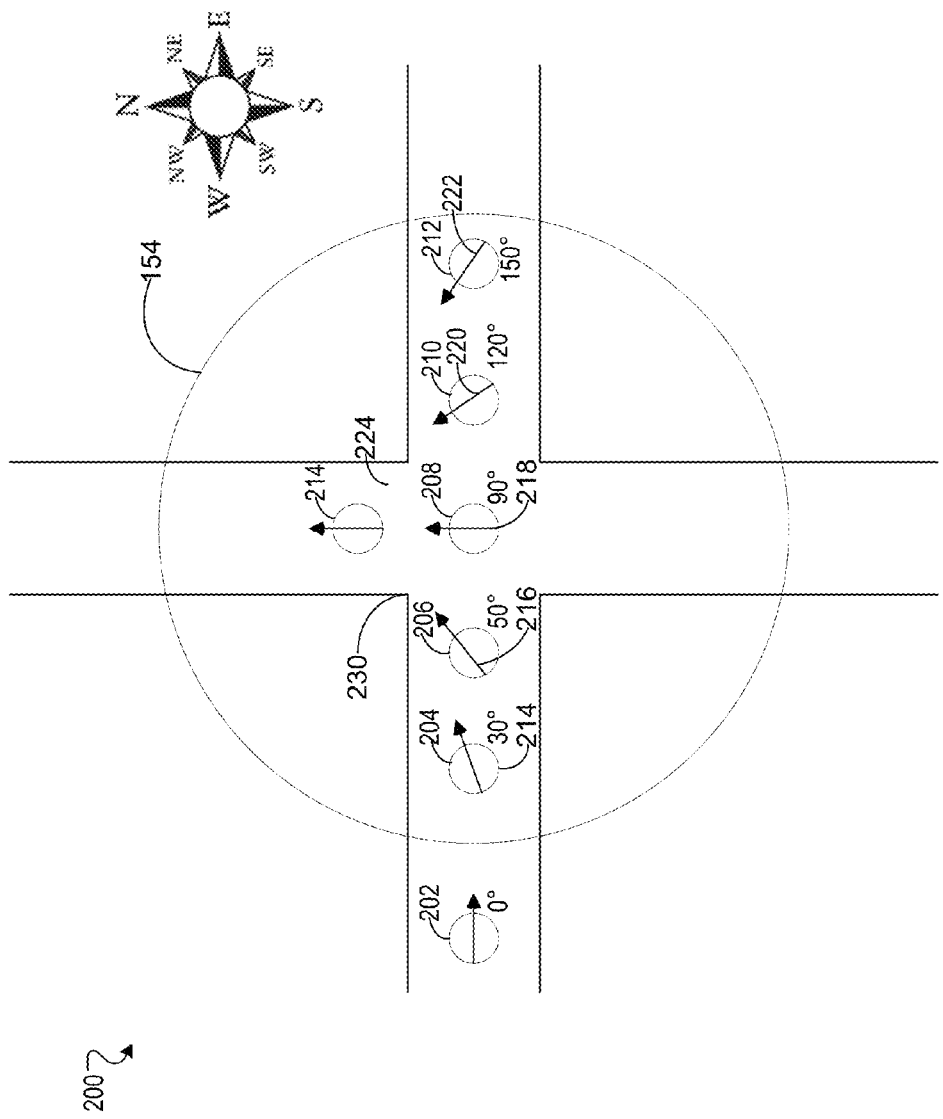
FIG. 2A is an illustration of a waypoint region around a waypoint and one implementation of providing binaural navigational cues.
Figure 2B:
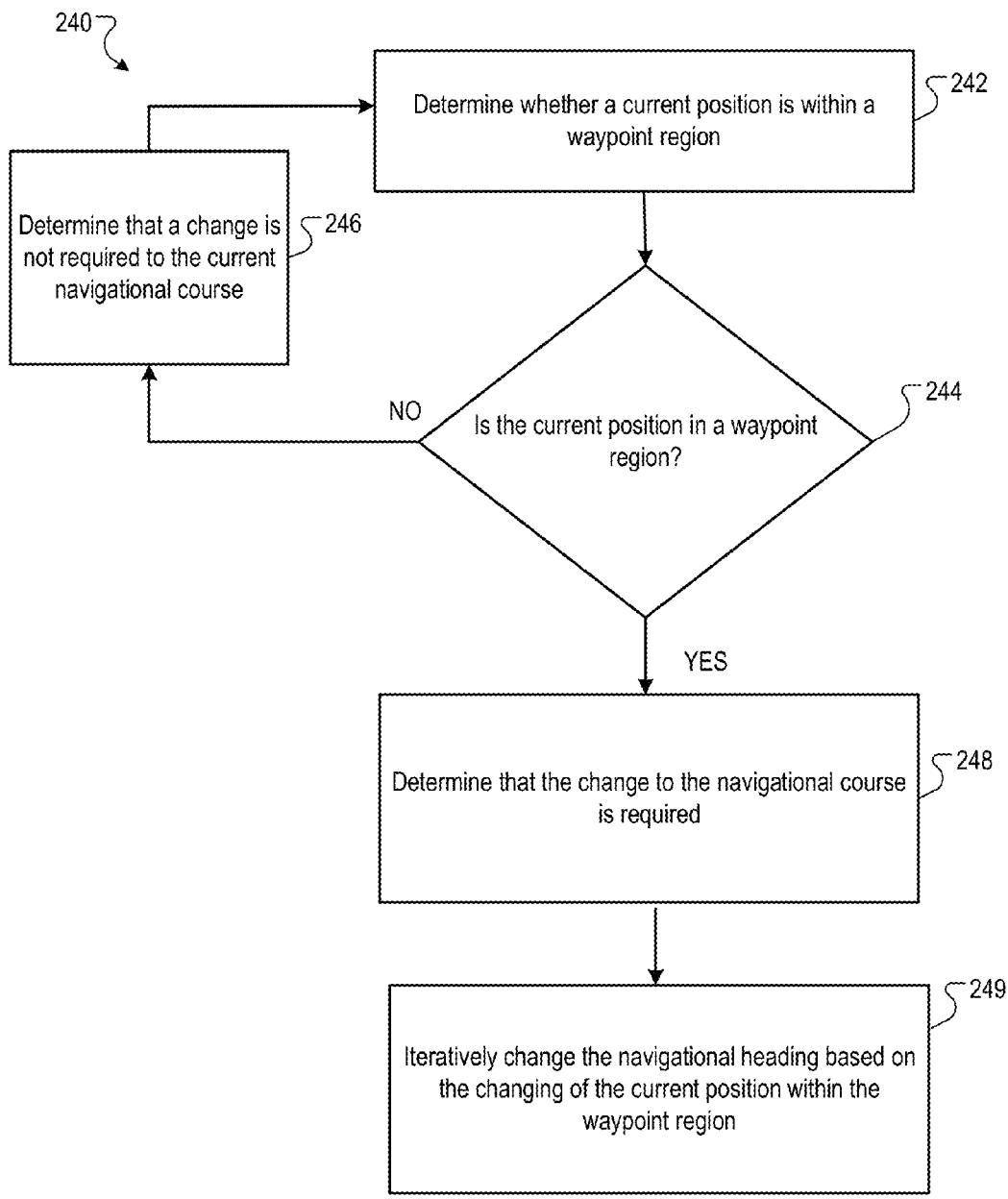
FIG. 2B is a flow diagram describing an iterative process for determining when to provide navigational cues.

FIG. 2A is an illustration of a waypoint region 154 around a waypoint 230 and one implementation of providing binaural navigational cues. In this implementation, the binaural navigational cue system 100 gradually modifies the audio media playback in the determined navigational heading's direction to assist the user in knowing when the change in the navigational heading is required. The amount of modification is dependent on the user's position within the waypoint region and relative to the waypoint. The radius of the waypoint region can be fixed, e.g., 10 meters, or can be set to a value specified by the user.

For example, once the user is within the waypoint region 154, the binaural navigational cue system 100 iteratively modifies the direction the audio media is perceived as the user gets closer to the waypoint, which is the center of the waypoint region 154. The process illustrated in FIG. 2B of modifying the audio as a user traverses a waypoint region is a flow diagram 240 describing an iterative process for determining when to provide navigational cues, will be discussed in connection with FIG. 2A.

In this instance, a user, who is presented with audio media utilizing the user device 104, is in an initial position 202, which is outside of the waypoint region 154, with an example current heading of 90 degrees.

The binaural navigational system 100 determines whether a current position is within a waypoint region 154 (242). At the initial position 202, the current position is outside of the waypoint region 154 (244). Thus, the binaural navigational system 100 determines that a change to the current navigational course is not required (246). Audio is thus presented in a non-directional format. At the next iteration, the binaural navigational system 100 determines again whether a current position is within a waypoint region 154 (242). The process 240 continues as the user walks eastward.

As the user proceeds to the second position 204, the binaural navigational cue system 100 determines whether a current position is within a waypoint region 154 (242). At the second position 202, the current position is inside of the waypoint region 154 (244) and the binaural navigational cue system 100 determines that a change to the navigational course is required (248). Accordingly, the binaural navigational cue system 100 modifies the playback state of the audio media to the directional playback state. With the current position within the waypoint region 154, the binaural navigational system 100 iteratively changes the navigational heading based on a changing of the current position in the waypoint region 154 (249).

At the second position 204, the determined navigational heading is approximately 30 degrees 214. Thus, the binaural navigational is the audio media being played in the directional playback state such that the audio media is perceived to appear as though the source of the audio file is 30 degrees north relative to the 90 degree navigational heading, e.g., 60 degrees from true north.

As the current position approaches the left-hand turn 224 and the current navigational course has not changed, such that the current navigational course is still proceeding in the direction of 90 degrees, the determined navigational heading continues to increase towards the determined 90 degree navigational heading 218. For example, at the third position 206, the determined navigational heading is 50 degrees 216. Thus, the audio file is still in the directional playback state and the source of the audio file is perceived to come from 50 degrees north relative to the 90 degree navigational heading.

As the current position reaches the fourth position 208, the determined navigational heading is 90 degrees 218. The audio media will appear to be played back from the 90 degree navigational heading 218. In some instances, the playback may only be played in the left ear of the headphones 102. In other instances, the playback may be louder in the left ear and seem distant in the right ear. The appearance of the audio media playback originating from some point in space 90 degrees counter-clockwise indicates to the user to make a left-hand turn 224 at that intersection.

If the user continued on to the fifth position 210 or the six position 212, the navigational heading would modify to directions 220 and 222, respectively. The directional state of playback would modify the audio media to sound as if it were coming from 120 degrees or 150 degrees which would appear to be behind the head of the user. Playing the audio media to appear as if it were coming from behind the user indicates that the determined navigation heading to continue along the navigational route was passed and is now behind the current position.

Once the binaural navigational cue system 100 determines that the current navigational course is following the determined navigational heading, as in position eight 214, the audio may be again presented in a non-directional state. In other implementations, the binaural navigational cue system 100 may set an absolute direction (e.g., magnetic north) as 0 degrees and determine subsequent navigational headings from 0-360 degrees relative to 0 degrees consistently being defined by the absolute direction.

In some implementations, the binaural navigational cue may be an audible voice that dictates the intended direction to the user with the sound of the voice appearing to come from the determined navigational heading. For example, the binaural navigational system 100, in response to determining the navigational heading, can provide a directional voice that describes the manner in which to alter the current navigational course in the direction of the navigational heading and that is directional from the navigational heading.

Providing binaural navigational cues when the current position enters a waypoint region indicates to the user that a change in the navigational course is approaching. If the playback state remains in the non-directional playback state (i.e., the audio media is being presented in its original format), the user understands that the current navigational course is correct. If the user changes the navigational heading without indication from the binaural navigational cue system, the playback state can change to the directional playback state to correct the navigational course and/or navigational heading back to the proper navigational route.

Figure 2C:
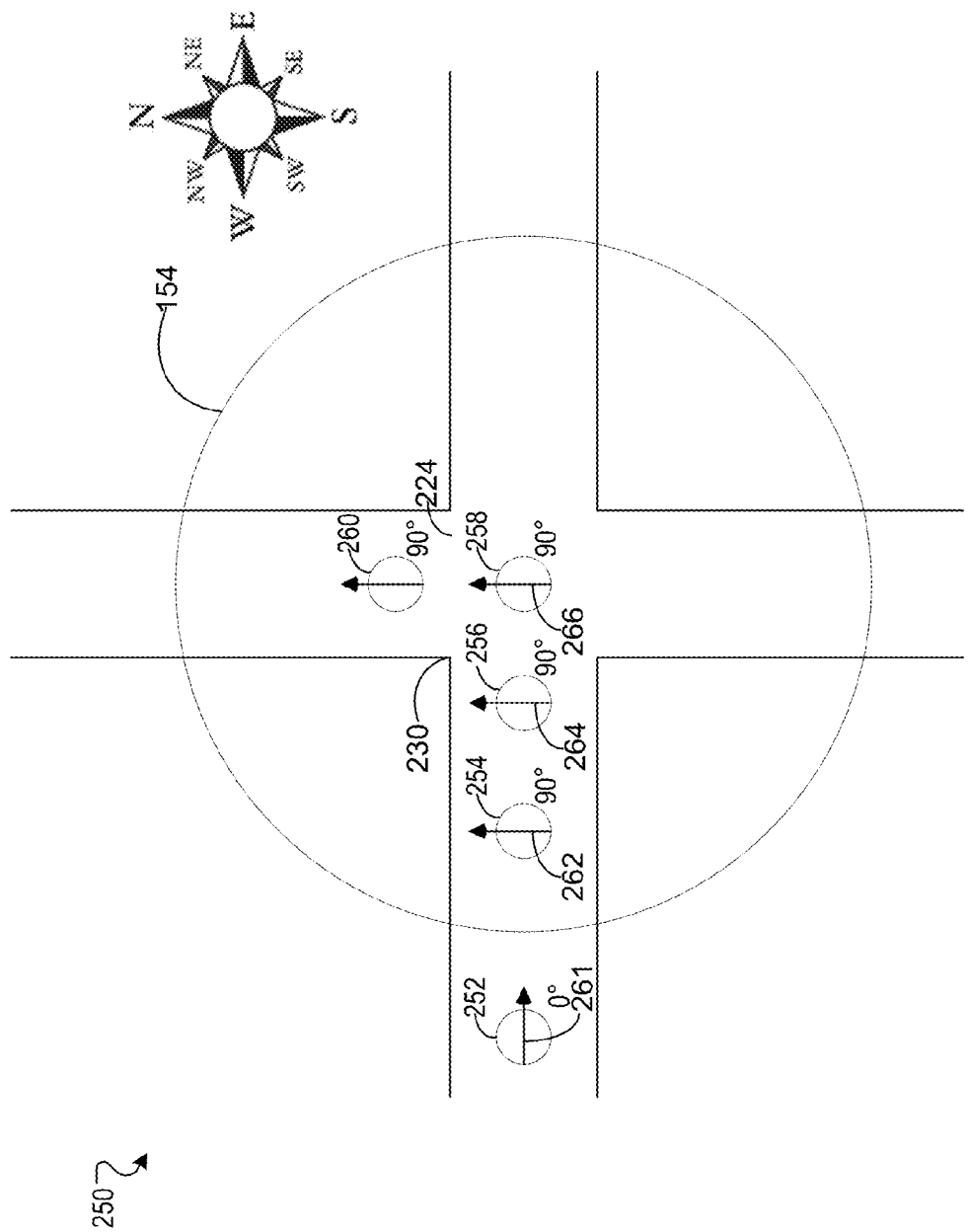
FIG. 2C is an illustration of a waypoint region around a waypoint and another implementation of providing binaural navigational cues.

FIG. 2C is an illustration of a waypoint region 154 around a waypoint 230 and another implementation of providing binaural navigational cues. Similar to FIG. 2A, the initial position 252 is outside of the waypoint region and the current navigational heading is described as 90 degrees. Likewise, the binaural navigational system 100 is in the non-directional playback state, where the audio music is presented in its original format.

As the current position moves to the second position 254, which is inside of the waypoint region 154. The determined navigational heading 262 is 90 degrees. Accordingly, the binaural navigational cue system 100 modifies the playback state of the audio media from the non-directional playback state to the directional playback state. Modifying the playback state presents the audio media to the user such that the audio media appears to originate from a point in space 90 degrees counter-clockwise from the initial position's navigational heading (e.g., originating from 0 degrees, or true north).

In this implementation, presenting the media appearing to originate from a source that is north indicates that the user is to take the next left-hand turn 224. As shown in FIG. 2C, as the current position progresses to the third and fourth position 256 and 258, the determined navigational heading 264 and 266 remain 90 degrees counter-clockwise which continues to indicate the user of the determined change of navigational heading is approaching.

FIG. 3 is an illustration of a map 300 and another implementation of providing binaural navigational cues. The binaural navigational cue system 100 presents an audible sound in addition to the presentation of the audible media, where the audible sound is directional from a cardinal direction to which the current navigational course is relative. The audible sound can indicate the position of a known cardinal direction (e.g., north, south, east, west, etc.) or geographic location (e.g., a known landmark, the user's home, etc.). For example, an audible sound can be presented to the user such that the sound is perceived to come from the direction of north 302.

The audible sound can be a distinct sound that is audibly different than the audio file that is presented to the user (e.g., a low hum, a buzz, a beep, etc.). In some implementations, the audible sound is presented intermittently according to a predetermined time interval. For example, the audible sound can be presented every 30 seconds, 1 minute, 15 seconds, at the end of a song, etc. In other implementations, the audible sound can be played constantly under the playback of the audio media.

FIG. 3 shows a user that can be in the initial position 304 and cardinal north 302. Accordingly, the user hears an audible sound that is perceived to come from the same direction 312 as cardinal north 302. As the user proceeds to the second and third position 306, 308, the audible sound is still perceived to come from the same direction 314, 316, which would be to the user's left or 90 degrees relative to the user. Upon the user changing navigational course and navigational heading, as shown at the fourth position 310, the audible sound is still coming from the same direction 318, but due to the change in navigational heading the sound appears to come from behind the user or at 180 degrees relative to the user.

In situations in which the systems discussed here collect personal information about users, or may make use of personal information, the users may be provided with an opportunity to control whether applications or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   presenting audio media in a non-directional playback state that presents an audio media in an original format over a plurality of audio channels, wherein the presentation in the original format over the plurality of channels is not directionally related to a navigational route;
   iteratively determining a navigational heading relative to a current navigational course, the navigational heading indicative of a direction to face to proceed along the navigational route, and for each iteration, determining whether a change is required to the current navigational course based on the navigational heading;
   for each determination that a change is not required to the current navigational course, presenting the audio media in the non-directional playback state; and
   for each determination that a change is required to the current navigational course, changing the non-directional playback state to a directional playback state that presents the audio media in a modified format that is directional from the navigational heading.

2. The computer-implemented method of claim 1, further comprising presenting an audible sound in addition to the presentation of the audio media, where the audible sound is directional from a cardinal direction to which the current navigational course is relative.

3. The computer-implemented method of claim 2, wherein the audible sound is presented intermittently according to a predetermined time interval.

4. The computer-implemented method of claim 1, further comprising, in response to determining the navigational heading, providing a directional voice that describes a manner in which to alter the current navigational course in the direction of the navigational heading and that is directional from the navigational heading.

5. The computer-implemented method of claim 1, wherein the audio media comprises pre-recorded audio media.

6. The computer-implemented method of claim 1, wherein the audio media comprises live broadcast audio media.

7. The computer-implemented method of claim 1, further comprising:
   receiving an indication of an interaction with a geographical location depicted on an interactive map;
   determining a direct navigational heading from a current location of the geographic location; and
   changing the non-directional playback state to a directional playback state that presents the audio media in a modified format that modulates a sound level of at least one of the audio channels so that playback is directional from the direct navigational heading.

8. The computer-implemented method of claim 1, wherein iteratively determining the navigational heading relative to the current navigational course, comprises, for each iteration:
  determining whether a current position is within a waypoint region;
  if the current position is not within the waypoint region, determining that the change is not required to the current navigational course; and
  if the current position is within the waypoint region, determining that the change is required to the current navigational course.

9. The computer-implemented method of claim 8, wherein when the current position is within the waypoint region, iteratively changing the navigational heading based on a changing of the current position in the waypoint region.

10. The computer-implemented method of claim 1, wherein the modified format comprises modulating a sound level of at least one of the audio channels.

11. A system, comprising:
  a processing apparatus configured to:
    present audio media in a non-directional playback state that presents an audio media in an original format over a plurality of audio channels, wherein the presentation in the original format over the plurality of channels is not directionally related to a navigational route;
    iteratively determine a navigational heading relative to a current navigational course, the navigational heading indicative of a direction to face to proceed along the navigational route, and for each iteration, determining whether a change is required to the current navigational course based on the navigational heading;
    for each determination that a change is not required to the current navigational course, present the audio media in the non-directional playback state; and
    for each determination that a change is required to the current navigational course, change the non-directional playback state to a directional playback state that presents the audible media in a modified format that is directional from the navigational heading.

12. The system of claim 11, further comprising presenting an audible sound in addition to the presentation of the audio media, where the audible sound is directional from a cardinal direction to which the current navigational course is relative.

13. The system of claim 12, wherein the audible sound is presented intermittently according to a predetermined time interval.

14. The system of claim 11, further comprising, in response to determining the navigational heading, providing a directional voice that describes a manner in which to alter the current navigational course in the direction of the navigational heading and that is directional from the navigational heading.

15. The system of claim 11, wherein the audio media comprises pre-recorded audio media.

16. The system of claim 11, wherein the audio media comprises live broadcast audio media.

17. The system of claim 11, further comprising:
  receive an indication of an interaction with a geographical location depicted on an interactive map;
  determine a direct navigational heading from a current location of the geographic location; and
  change the non-directional playback state to a directional playback state that presents the audio media in a modified format that modulates a sound level of at least one of the audio channels so that playback is directional from the direct navigational heading.

18. The system of claim 11, wherein iteratively determining the navigational heading relative to the current navigational course, comprises, for each iteration:
  determining whether a current position is within a waypoint region;
  if the current position is not within the waypoint region, determining that the change is not required to the current navigational course; and
  if the current position is within the waypoint region, determining that the change is required to the current navigational course.

19. The system of claim 18, wherein when the current position is within the waypoint region, iteratively changing the navigational heading based on a changing of the current position in the waypoint region.

20. The system of claim 11, wherein the modified format comprises modulating the audio by a head-related transfer function (HRTF).

21. A non-transitory computer readable medium storing instructions executable by a data processing apparatus and upon such execution cause the data processing apparatus to perform operations comprising:
  present audio media in a non-directional playback state that presents the audio media in an original format over a plurality of audio channels, wherein the presentation in the original format over the plurality of channels is not directionally related to a navigational route;
  iteratively determine a navigational heading relative to a current navigational course, the navigational heading indicative of a direction to face to proceed along the navigational route, and for each iteration, determining whether a change is required to the current navigational course based on the navigational heading;
  for each determination that a change is not required to the current navigational course, present the audio media in the non-directional playback state; and
  for each determination that a change is required to the current navigational course, change the non-directional playback state to a directional playback state that presents the audio media in a modified format that is directional from the navigational heading.

* * * * *